United States Patent [19]
Schoenberger

[11] Patent Number: 6,093,226
[45] Date of Patent: Jul. 25, 2000

[54] VACUUM FILTRATION SYSTEM

[76] Inventor: Stephen B. Schoenberger, 865 Hawthorne La., Northbrook, Ill. 60062

[21] Appl. No.: 09/008,731

[22] Filed: Jan. 19, 1998

[51] Int. Cl.[7] .......................... B01D 29/52; B01D 35/147
[52] U.S. Cl. .................................. 55/310; 55/484; 96/403
[58] Field of Search .............................. 55/484, 302, 283, 55/286, 287, 508, 498, 500, 301, 291, 310, 309; 96/400, 403, 405, FOR 103

[56] References Cited

U.S. PATENT DOCUMENTS

| | | | |
|---|---|---|---|
| 4,218,227 | 8/1980 | Frey ........................................... | 55/484 |
| 4,278,454 | 7/1981 | Nemesi ...................................... | 55/484 |
| 5,145,496 | 9/1992 | Mellen ....................................... | 96/403 |
| 5,290,330 | 3/1994 | Tepper et al. .............................. | 55/484 |

FOREIGN PATENT DOCUMENTS

| | | | |
|---|---|---|---|
| 1139479 | 2/1985 | Russian Federation .................. | 55/301 |

OTHER PUBLICATIONS

Vecloader—Industrial Vacuuming System Designed to Meet Your Needs—Vacuum Engineering—A Vector Technologies Ltd., Co., 1997.

"The little Sucker"—Super Products, 1990.

HV727—Industrial Vacuum Equipment Corp., 1996.

*Primary Examiner*—David A. Simmons
*Assistant Examiner*—Robert A. Hopkins

[57] ABSTRACT

A filtration apparatus for an industrial vacuum system which includes a source of vacuum pressure, a collection vessel having an opening at one end for the collection of solid particulate matter and liquid waste material, and a conduit extending between the source of vacuum pressure and a second end of the collection vessel to apply the vacuum pressure to the collection vessel. A filtration chamber forms part of the collection vessel and is located between the two ends of the collection vessel. A filter media array is disposed in the filtration chamber, wherein the filter media array includes a plurality of non-woven or spun-bound pleated filter cartridges in at least two linear columns in the filtration chamber. In a preferred embodiment, control elements provide a maximum pressure differential across the body of the filter cartridges by providing an in-rush of ambient air into the filtration chamber when the pressure differential reaches a pre-determined quantity.

4 Claims, 3 Drawing Sheets

VACUUM FILTRATION SYSTEM

The present invention relates to a filtration apparatus for relatively large vacuum systems. In particular, the present invention relates to a pleated filter media disposed in the form of cartridges and inserted into the separator of a relatively large high power and high vacuum level vacuum loader system.

BACKGROUND OF THE INVENTION

Industrial vacuuming loading systems are currently available which are used for vacuuming and removing coal, ash, dirt, dust, sand, stone, water, slurry and the like from work and industrial sites, as well as from equipment which tends to be covered with debris or residue during operation. The vacuum loader picks up and deposits the debris in a containment vessel. Typical uses for such vacuum systems are in cleaning conveying equipment, hopper rooms, silos, tanks, pulverizing mills, spills and oil slicks from wastewater treatment ponds, sump pump pits, boiler intervals during outages, bottom ash, blasting sand, slag and steel shot, roofing gravel and ballast stone.

A typical high power, high vacuum level vacuum system is mounted on a tandem and/or tri-axle trailer or skid, and includes a diesel or gasoline engine or electric motor, typically, which drives a positive displacement pump (Roots or equal) to create a vacuum. In a preferred embodiment, the pump is rated at 370 inches $H_2O$ (27 inches Hg). A chamber type abortion silencer is attached to the blower discharge for sound suppression. In those industries in which such systems are used, a vacuum pressure in excess of 15 inches Hg and air flow capacity in excess of 900 CFM is deemed a high power, high level vacuum application.

A collection system or vessel is connected to the source of vacuum pressure, which collection system typically comprises two stages. The first stage is a relatively large diameter cyclone collector, which in one embodiment has a fifty-four inch diameter, a six-inch diameter tangential inlet, and a ⅞ cubic yard capacity conical storage area. Other sized collectors may be utilized, depending upon the applications. A baghouse for final filtration of particulate forms part of the collection module. A circumferential deflector plate is provided to protect the filters in the baghouse from particles entering the cyclone collector. Suitable means are also provided to allow dumping of collected debris from the collection vessel, such as solid state controls to automatically dump the collected material on a pre-selected timed cycle, with a short cycle for liquids and a longer cycle for dry materials.

In previous devices of the type generally described above, the filtration system used in the bag collector for high vacuum pressure applications consisted of multiple filter bags which require a fully packaged baghouse to achieve optimum collection results. By way of example, a typical prior filtration system for a high power, high level vacuum system would comprise approximately thirty-seven filter bags in a given diameter collector, providing 156 square feet of filter media, with 4.2 square feet of area per filter.

A primary object of the present invention is to provide a filtration system for an industrial vacuum cleaning apparatus which produces greater efficiency of filtration of particulate matter while operating at higher vacuum pressures.

A further object of the present invention is to provide a filtration system for a vacuum cleaning apparatus which includes a cartridge construction wherein substantially more filter media can be placed within a limited space.

A further object of the present invention is to provide a filtration system for a vacuum cleaning apparatus, including means to avoid a high differential pressure situation across the filters.

Yet another object of the present invention is to provide a filtration system for a vacuum cleaning apparatus wherein the cyclone vessel's can velocity is maintained at a relatively low value, which reduces the burden on the filter media. Further, the construction of the filter media elements of the present invention allows substantial increases in air-to-cloth ratios while occupying limited space in the vessel compared to prior filter bags.

SUMMARY OF THE INVENTION

These and other objects of the present invention are satisfied by the present invention, which provides a filtration apparatus for an industrial vacuum system comprising a source of vacuum pressure and a collection vessel having an opening at one end for the collection of solid particulate matter and liquid waste material. A conduit extends between the source of vacuum pressure and a second end of the collection vessel to apply the vacuum pressure to the collection vessel. A filter media array is disposed in a filtration chamber forming part of the collection vessel, the filtration chamber located between the one end and second end of the collection vessel. The filter media comprises a plurality of pleated filter cartridges, in one embodiment extending in at least two linear columns in the filtration chamber. In another embodiment, a pressure differential sensor and switch limits the pressure differential across the filters to prevent collapse of the filters under high differential pressure conditions. The pleated filter array of the present invention maintains the can velocity at a relatively low value, thus reducing the load on the filters, and also provides a substantial increase in air-to-cloth ratio while occupying less space in the vacuum vessel.

BRIEF DESCRIPTION OF THE DRAWINGS

The present invention can best be understood by the ensuing detailed description of the preferred embodiment, read in conjunction with the accompanying drawings, wherein.

DETAILED DESCRIPTION OF THE PREFERRED EMBODIMENT

Figure 1:
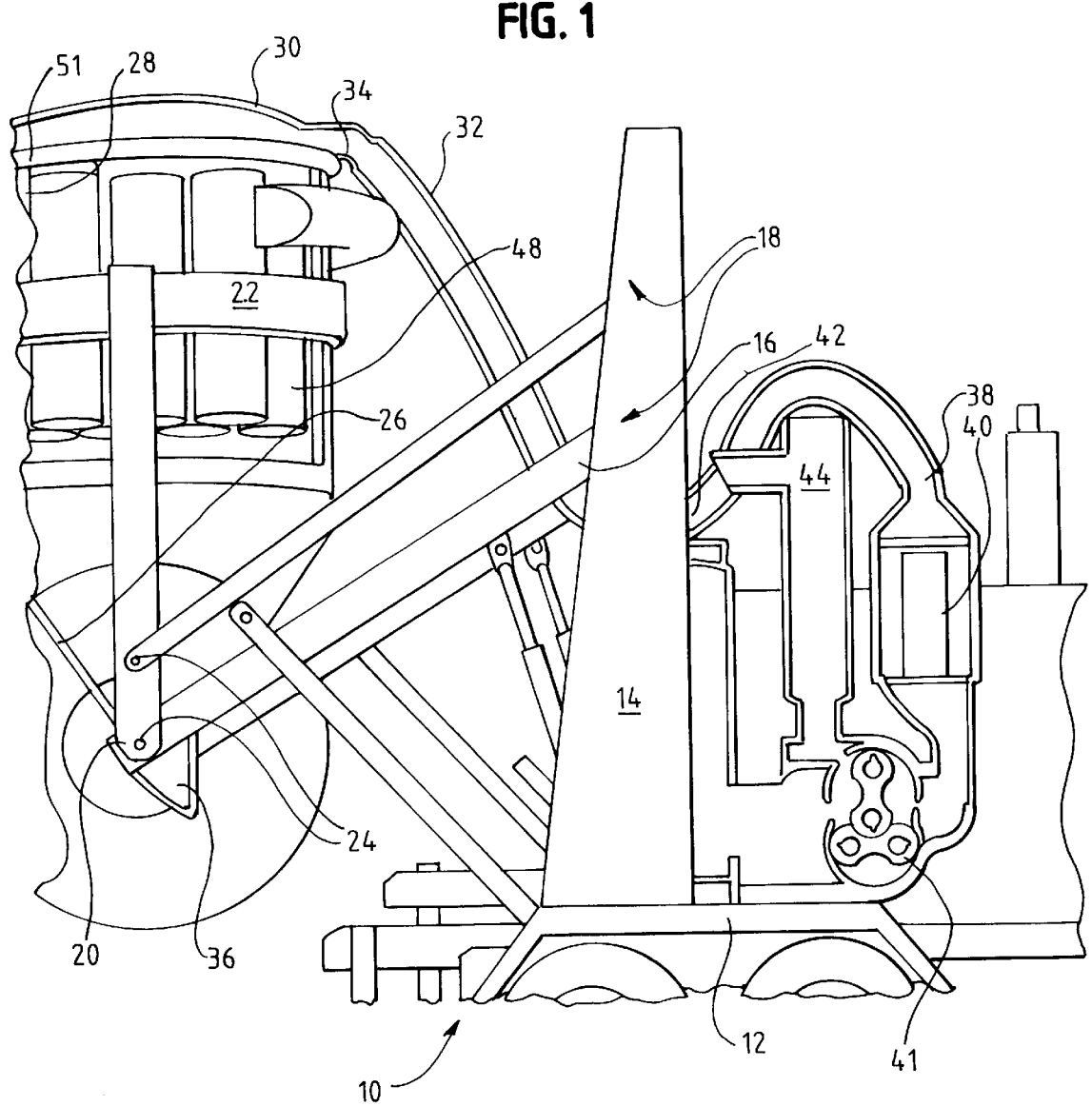
FIG. 1 is a schematic side elevation view of a trailer-mounted portable industrial vacuum system which incorporates the filtration system of the present invention.

In a preferred embodiment of the present invention, FIG. 1 illustrates a portable industrial vacuum system 10 mounted on a vehicle trailer 12. The vacuum system 10 could also be mounted on a skid (not shown) A vertically extending support frame 14 is rigidly mounted to trailer 12. A pair of articulated parallelogram arm systems 16 are pivoted to support frame 14 at 18, and arm systems 16 are moveable in a vertical plane. The outer ends 20 of arm systems 16 pivotally mount a cyclone collector 22 at pivot points 24. Collector 22 includes a hollow conical storage area 26 and a cylindrical filtration chamber 28. Above filtration chamber 28 is a plenum chamber 30, and a flexible conduit 32 is attached to plenum chamber 30 at entrance port 34. Beneath conical storage area 26 is an angled inlet port 36 which is adapted to contact the surface to be cleaned, and through which solid particulate matter and liquid debris are caused to enter storage area 26 under the influence of vacuum pressure applied to inlet port 36, as will be explained.

Flexible conduit 32 is also connected at 38 to a chamber 40 leading to a positive displacement pump 41 (Roots or equivalent). Activation of pump 41 creates a vacuum pressure in conduit 32, which vacuum pressure is transferred through cyclone collector 22 to entrance port 34, as is known in the art. An exhaust chamber 42 is provided on the opposite side of pump 44. The vacuum pressure is ultimately applied to inlet port 36 for the purpose of drawing particulate matter and debris into storage area 26.

In the preferred embodiment, pump 41 creates a vacuum pressure of 370 inches $H_2O$ negative static pressure (27 inches Hg) at a rated air flow of 3273 CFM. As will be explained, the present invention includes a filter protection system to prevent the pressure differential in the filtration chamber 28 from exceeding 17 inches $H_2O$. The presently disclosed system is capable of functioning optimally where static pressures are equal to or in excess of 200 inches $H_2O$ (15 inches Hg).

Figure 2:
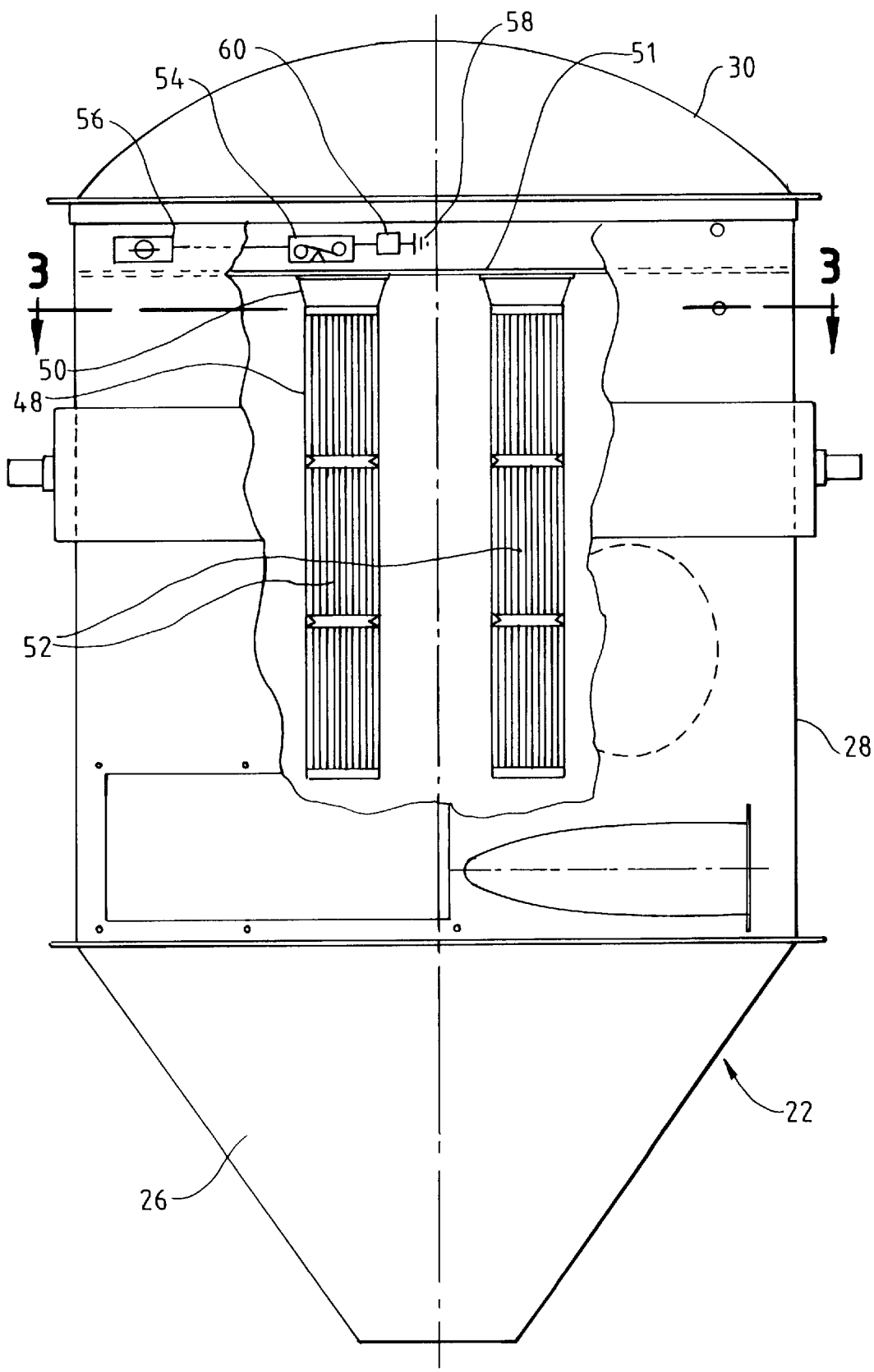
FIG. 2 is a partially cut-away side elevation view of the cyclone collector portion of the vacuum system of FIG. 1, illustrating the location of the pleated filter cartridges forming the filter media.
Figure 3:
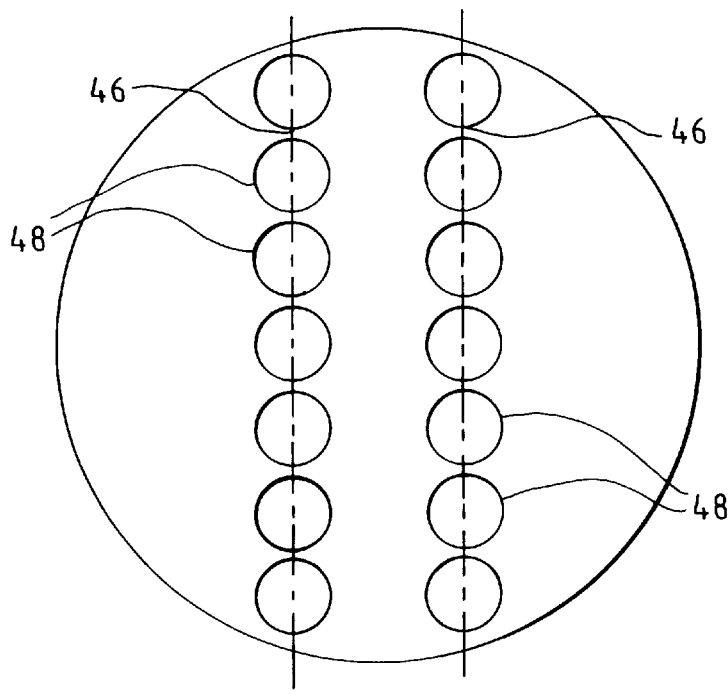
FIG. 3 is a top plan view of the filter cartridge array of the present invention, taken along line 3—3 of FIG. 2.

FIG. 2 is an illustration of cyclone collector 22, which includes cylindrical filtration chamber 28 shown partially cut away to expose the inside of chamber 28. In the trade, chamber 28 may be commonly referred to as the baghouse portion. Referring to the embodiment of FIGS. 2 and 3 together, filtration chamber 28 comprises two rows 46, each row 46 including seven pleated cartridge filters 48. Each filter cartridge is fixedly attached to a mounting plate 50, and each plate 50 is gasketed and mounted to the topside 51 of filtration chamber 28 below plenum chamber 30, providing a complete seal in chamber 28.

Figure 4:
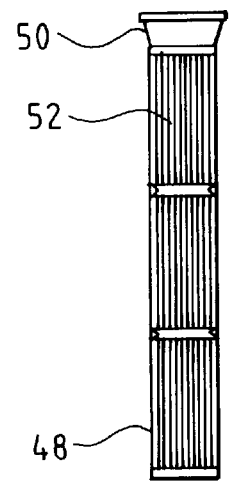
FIG. 4 is a detail side elevation view of one of the pleated filter cartridges illustrated in FIG. 3.

Each filter cartridge 48 (FIG. 4) of the present invention comprises pleated filter media 52, which permit substantial air-to-cloth ratios while occupying limited space in chamber 28, as compared to a known filter bag. In a preferred embodiment of the present invention, the cartridge filters comprise pleated non-woven polyester filter cartridges which clean the incoming air entering chamber 28 through inlet port 36 (FIG. 1). Also, in a preferred embodiment, non-woven filters 48 provide a minimum area of 630 square feet of spun-bound polyester material, and can withstand temperatures up to 180° F. In addition, an auxiliary microfilter may be provided having 370 square feet of pleated paper filter (not shown) on the clean air side of filtration chamber 28.

The present invention also incorporates a secondary protection system to prevent the filter cartridges 48 from collapsing due to high pressure differentials across the filter body. The secondary protection system prevents the pressure differential across the filters from reaching 17 inches $H_2O$. A pressure differential switch 54 located in chamber 28 (FIG. 2) is calibrated to interrupt the vacuum cycle at a pressure differential of 17 inches $H_2O$ across the filter cartridges 48, and provide a cleaning in-rush of air through a solenoid operated vacuum break butterfly valve 56. This cycle repeats itself until the pressure differential across the filters is within acceptable limits. A magnehelic gauge can be provided to display the differential pressure drop across the filters. The pressure differential switch 54 is energized by a power source 58, and an internal timer 60 is disposed in series between the power source 58 and pressure differential switch 54.

Up to the time of the present invention, pleated filters were used only in applications involving low differential pressures such as 12 to 14 inches $H_2O$, since high differential pressures would cause the filter media to crush. The present invention avoids a high pressure differential situation across the filter media through use of the above-described pressure differential switch 54. The switch 54 also serves an additional purpose. In the event of filter loading, the pressure differential switch interrupts the vacuum cycle to send a reverse surge of air through the filters to enhance filter cleaning.

Figure 5:
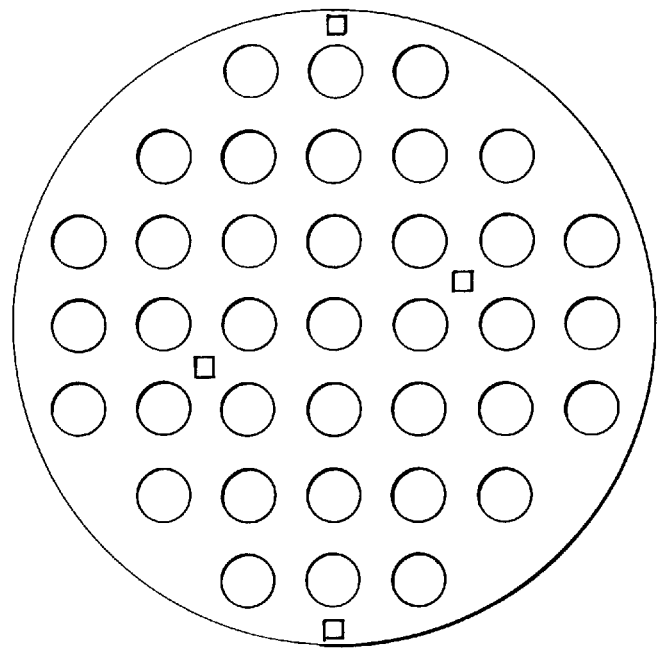
FIG. 5 is a top plan view of a prior-art filter array used in industrial vacuum systems.

An additional feature of the present invention which avoids crushing the filters is provided by the pleated configuration of the filter cartridges 48. The pleated filters 52 keep the can velocity inside cyclone collector 22 low, which reduces the load on the filters. The pleated filters 52 also permit substantial increases in cloth-to-air ratios while occupying limited space in the vessel, compared to the use of filter bags. In a preferred embodiment of the present invention, 630 square feet of filter media are encompassed in fourteen cartridges, utilizing less space than prior structures which provided 157 square feet of filter media using 37 filter cartridges, which prior stricture is illustrated in FIG. 5.

In the present invention, the filter cartridges 48 are cleaned continuously by pulse air sequences. The application of a continuous reverse pulse system utilizes a blast tube (not shown) to deliver blasts of air down the center of each filter which keeps the filters clean. The periodic blasts of air are controlled by a sequential timer (not shown). A separate air compressor and air retention manifold (not shown) may be provided to apply the blasts of air to clean the filters.

The foregoing description of a preferred embodiment of the invention has been presented for purposes of illustration and description, and is not intended to be exhaustive or to limit the invention to the precise form disclosed. The description was selected to best explain the principles of the invention and the practical application of those principles to enable others skilled in the art to best utilize the invention in various embodiments and modifications as are suited to the best use contemplated. It is intended that the scope of the invention not be limited by the specification, but be defined by the scope of the claims set forth below.

I claim:

1. A filtration apparatus for an industrial vacuum system comprising:

a source of vacuum pressure;

a collective vessel having an opening at one end thereof for the collection of solid particulate matter and liquid waste material;

a conduit extending between the source of vacuum pressure and a second end of the collection vessel to apply the vacuum pressure to the collection vessel;

a filtration chamber forming part of the collection vessel, the filtration chamber disposed between said one end and said second end of the collection vessel;

a filter media array including filter cartridges disposed in the filtration chamber;

sensor means to sense the pressure differential across the filter cartridges, and control means responsive to said sensor means to prevent the pressure differential across the filter cartridges from exceeding a pre-determined pressure by interrupting the vacuum cycle at the predetermined pressure and providing an air in-rush of non-pressurized ambient air to the filtration chamber.

2. The filtration apparatus of claim 1 wherein said predetermined pressure is 17 inches $H_2O$.

3. The filtration apparatus of claim 1 including a vacuum break butterfly valve operatively connecting said vacuum chamber to ambient air outside the filtration chamber, the butterfly valve being operated by the control means.

4. The filtration apparatus of claim 3 including a solenoid operatively connecting the control means to the vacuum break butterfly valve.

* * * * *